United States Patent Office 3,819,614
Patented June 25, 1974

3,819,614
7,12 DI(LOWER)ALKYL-HOMOBENZMORPHANS
Stephen I. Sallay, Fort Wayne, Ind., assignor to American Home Products Corporation, New York, N.Y.
No Drawing. Filed Oct. 22, 1970, Ser. No. 83,150
Int. Cl. C07d 41/08
U.S. Cl. 260—239 BB   3 Claims

ABSTRACT OF THE DISCLOSURE

Novel 7,12 - di(lower)alkyl-homobenzmorphans have been prepared which are pharmacologically active as control nervous system depressants.

DESCRIPTION OF THE INVENTION

This invention relates to compounds of Formulae I and II and to intermediate compounds for their production:

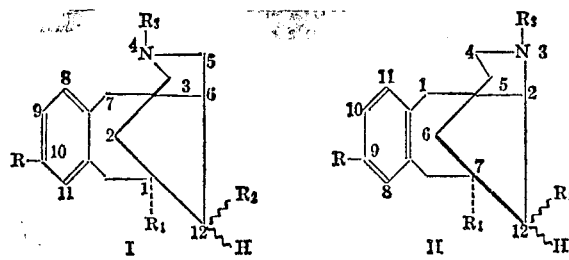

wherein R is selected from the group consisting of hydrogen, hydroxy, (lower)alkyl, (lower)alkoxy and phen (lower alkyl); $R_1$ and $R_2$ are selected from the group consisting of methyl and ethyl; and are cis or trans; $R_3$ is selected from the group consisting of hydrogen, (lower)alkyl, (lower)alkenyl, cycloalkyl, cycloalkyl(lower alkyl) and phen(lower alkyl).

When used herein the term (lower)alkyl contemplates alkyl groups of 1 to about 6 carbon atoms and includes methyl, ethyl, n-propyl, i-propyl, n-butyl, i-butyl and n-hexyl. The term cycloalkyl is used herein to include cyclopropyl, cyclobutyl, cyclopentyl and cyclohexyl. As used herein, the term (lower) alkenyl is used to include vinyl, propenyl, 1-butene, 2-butene, 3-methyl-2-butene and the like.

The intermediates prepared in this invention are also novel compounds.

The novel processes of the invention employ a 1-(lower) alkyl-7-R-2-tetralone as a starting material. The starting material may be first alkylated in the 1-position in the presence of an organic solvent such as toluene, benzene, dimethylformamide, dimethylsulfoxide, etc. to form the acetal. Suitable alkylating reagents include: 3-chloropropionaldehyde dimethyl-acetal, 3 - bromopropionaldehyde diethyl acetal, 3-chloro or 3-bromopropionaldehyde ethyleneglycol acetal etc. The acetal is then hydrolyzed in a solvent such as methanol, ethanol, acetone, methylethylketone or dioxane to which an acid such as hydrochloric, sulfuric, toluene-sulfonic acid, etc. has been added. The hydrolysis results in the formation of the aldehyde which undergoes cyclization at the 3-position to form the ketone alcohol. Then a protective group is applied to protect the alcohol function. Of particular interest is the use of a tetrahydropyranyl group which may be formed by reacting the alcohol group with dihydropyran. A Wittig reaction may then be run to convert the keto group to an alkylene group and subsequently the tetrahydropyranyl moiety is removed by acid hydrolysis followed by oxidation to the exoalkylene ketone. The oxime is then formed by addition of hydroxylamine which yields a mixture of syn and anti oximes. A Beckman rearrangement is used to form the lactam and the alkylene reduced to an alkyl group. Thereafter the lactam is reduced to the amine using a reducing agent such as lithium aluminum hydride. If R is a lower alkoxy group, the phenol may be prepared by hydrolyzing the ether linkage. The amine is then alkylated and may be isolated as the hydrohalide salt.

In an alternate process the exomethylene group may be formed by running the Wittig reaction on the ketone after the lactam is formed by the Beckman rearrangement rather than doing so prior to forming the oxime.

In the pharmacological evaluation of the biological activity of the compounds of Formula I and Formula II, the *in vivo* effects were tested as follows: The compound was administered orally or intraperitoneally to three mice (14 to 24 grams) at each of the following doses:

400, 127, 40 and 12.7 milligrams per kilogram of host body weight (m.p.k.). The animals were watched for a minimum of two hours during which time signs of general stimulation, (i.e., increased spontaneous motor activity, hyperactivity on tactile stimulation, switching), general depression (i.e., decreased spontaneous motor activity, decreased respiration), autonomic activity (i.e., miosis, mydriasis, diarrhea) were noted.

Compounds of Formula I and Formula II induce central nervous system depressant effects at a dose of 12.7 to 400 m.p.k. Thus compounds of Formula I and Formula II have demonstrated utility as pharmacologically active compounds in experimental and comparative pharmacology and are of value in the treatment of mammals, e.g. mice, rats, etc., who are responsive to treatment with central nervous system depressant agents. Specifically the compounds may be administered for the purpose of inducing a calming effect in mammals.

When compounds are employed as described above, they may be administered alone or in combination with pharmacologically acceptable carriers, the proportion of which is determined by the solubility and chemical nature of the compound, chosen route of administration and standard pharmacological practice. For example, they may be administered orally in the form of tablets or capsules containing such excipients as starch, milk sugar, calcium carbonate and the like. They may be administered orally in the form of solutions which may contain coloring and flavoring agents or they may be administered by parenteral injection, e.g. intramuscular injection. The injectable solution may contain other solutes such as sodium chloride or glucose in a sufficient quantity to render the solution isotonic.

The dosage of the pharmacological therapeutic agents of the invention will vary with the route of administration and the particular compound chosen. Furthermore, it will vary with the particular subject under treatment. Generally, treatment is initiated with small dosages substantially less than the optimum dose of the compound. Thereafter, the dosage may be increased by small increments until the optimum effect under the circumstances is reached.

Example I 5,6,7,8,9,10 - hexahydro - 8 - hydroxy - 3 - methoxy-5 - methyl - 5,9 - methanobenzocycloocten - 11 - one.—To 0.2 mole of 1-methyl-7-methoxy-2-tetralone was added 0.205 mole of sodium amide in benzene to form its carbanion. Then the slurry was slowly treated with 3-chloropropionaldehyde dimethyl acetal (0.205 mole) while the reaction mixture was kept at ambient temperature. The reaction mixture was stirred overnight. It was then diluted with ice water and extracted with ether. The organic layer was dried and evaporated to an oil which was purified by distillation. The oil thus obtained which is 1,2,3,4 - tetrahydro - 7 - methoxy - 1 - methyl - 2 - oxo-1-naphthalene-propionaldehyde dimethyl acetal (0.2 mole)

is then dissolved in methanol and treated with 0.5 moles of 10% hydrochloric acid and refluxed for 2 hours. The reaction mixture is carefully recrystallized from ethanol-water to yield 5,6,7,8,9,10 - hexahydro - 8 - hydroxy - 3-methoxy - 5 - methyl - 5,9 - methanobenzocyclooctene-11-one, M.P. 120–124°.

Example II 5,6,7,8,9,10 - hexahydro - 3 - methoxy - 5 - methyl-8-(tetrahydropyran - 2 - yloxy) - 5,9 - methanobenzocyclo-octen-11-one.—0.1 mole of the compound obtained in Example I is dissolved in 20 ml. of dihydropyran and heated to 50° C. in the presence of a trace p-toluenesulfonic acid. The reaction mixture is allowed to stand at room temperature overnight and then the excess of dihydropyran was evaporated leaving 5,6,7,8,9,10-hexahydro - 3 - methoxy - 5 - methyl - 8 - (tetrahydropyran-2-yloxy)-5,9-methanobenzocycloocten-11-one.

Example III 5,6,7,8,9,10 - hexahydro - 3 - methoxy - 5 - methyl - 11-methylene - 8 - (tetrahydropyran - 2 - yloxy) - 5,9-methanobenzocyclooctene.—0.1 mole of the compound prepared in Example II was reacted with 0.11 mole of triphenylphosphonium methylide (prepared by the admixture at ambient temperature of 0.11 mole triphenyl-methylphosphonium iodide and 0.11 mole of dimsylsodium in DMSO) at a temperature of 25° C. The reaction mixture is stirred for eight hours at 25° C. and is then poured into a mixture of ice and water. The reaction mixture is then extracted with ether. The layer is evaporated to a thick gum which is 5,6,7,8,9,10-hexahydro-3-methoxy-5 - methyl - 11 - methylene - 8 - (tetrahydropyran - 2-yloxy)-5,9-methanobenzocyclooctene.

Example IV 5,6,7,8,9,10 - hexahydro - 3 - methoxy - 5 - methyl-11 - methylene - 5,9 - methanobenzocycloocten - 8 - ol.— product of Example III is dissolved in 10% ethanolic HCl and is refluxed for two hours. The reaction is then evaporated to dryness and the residue is extracted with ether. The organic extract is dried and evaporated yielding 5,6,7,8,9,10 - hexahydro - 3 - methoxy - 5 - methyl-11-methylene-5,9-methanobenzocycloocten-8-ol.

Example V 6,7,9,10 - tetrahydro - 3 - methoxy - 5 - methyl - 11-methylene - 5,9 - methanobenzocycloocten - 8($5\underline{H}$)-one.—0.1 mole of the compound obtained in Example IV is added dropwise at room temperature to a slurry of $CrO_3$-pyridine complex which is prepared from 0.1 mole of $CrO_3$. The reaction mixture is stirred for 5 hours at ambient temperature. Then the mixture is filtered and evaporated to a dark oil which is thereafter dissolved in benzene. The benzene solution is then extracted with dilute hydrochloric acid to remove the pyridine, dried, filtered and upon evaporation yields an oil. The oil is recrystallized from ligroin. The 6,7,9,10-tetrahydro-3-methoxy - 5 - methyl - 11 - methylene - 5,9 - methano-benzocycloocten-8($5\underline{H}$)-one has a M.P. of 82°–84° C.

Example VI 6,7,9,10 - tetrahydro - 3 - methoxy - 5 - methyl-11 - methylene - 5,9 - methanobenzocycloocten-8($5\underline{H}$) - one, oxime.—0.5 mole of the compound obtained in Example V is refluxed for 2 hours with 0.55 mole of hydroxylamineacetate dissolved in methanol. The reaction mixture is evaporated to dryness and thereafter extracted with benzene. The organic layer was dried, filtered and evaporated to give a mixture of the *syn* and *anti* form of 6,7,9,10-tetrahydro-3-methoxy-5 - methyl - 11 - methylene - 5,9 - methanobenzocyclo-octen-8-($5\underline{H}$)-one, oxime.

Example VII 1,2,3,5,6,7 - hexahydro - 9 - methoxy - 7 - methyl - 12-methylene - $4\underline{H}$ - 2,7 - methano - 3 - benzazonin - 4 - one and 1,2,3,4,6,7 - hexahydro - 10 - methoxy - 1 - methyl-12 - methylene - $5\underline{H}$ - 1,6 - methano - 4 - benzazonin - 5-one.—The product of Example VI is dissolved in pyridine and heated with 1 mole equivalent tosyl chloride for 1 hour. The temperature is allowed to rise from 20° to 80° C. The mixture is stored overnight at room temperature. The pyridine is evaporated and the residue is dissolved in benzene. The organic layer is dried, filtered and evaporated to dryness. The residue is twice recrystallized from a mixture of equal parts of ether and hexane yielding a mixture of 1,2,3,5,6,7 - hexahydro - 9 - methoxy-7 - methyl - 12 - methylene - $4\underline{H}$ - 2,7 - methano - 3-benzazonin - 4 - one and 1,2,3,4,6,7 - hexahydro - 10-methoxy - 1 - methyl - 12 - methylene - $5\underline{H}$ - 1,6-methano-4-benzazonin-5-one with a melting point of 166–168° C.

Example VIII 1,2,3,5,6,7-hexahydro - 9 - methoxy-7,12-dimethyl-$4\underline{H}$-2,7-methano - 3 - benzazonin-4-one and 1,2,3,4,6,7-hexahydro - 10 - methoxy-1,12-dimethyl-$5\underline{H}$-1,6-methano-4-benzazonin-5-one.—0.2 mole of the product of Example VII is reduced at room temperature and atmospheric pressure in acetic acid and in the presence of $PtO_2$. The catalyst is filtered off and the filtrate is evaporated to a thick syrup. The residue is dissolved in ether and washed with 0.1 N sodium hydroxide solution; is dried, filtered and evaporated to a crystalline mixture of the α and β isomers of 1,2,3,5,6,7-hexahydro-9-methoxy-7,12-dimethyl - $4\underline{H}$-2,7-methano-3-benzazonin-4-one and 1,2,3,4,6,7-hexahydro - 10-methoxy-1,12-dimethyl-$5\underline{H}$-1,6-methano-4-benzazonin-5-one., M.P. 154–160° C. After twice being recrystallized from methanol, the mixture melted at 192–194° C.

Example IX 2,3,4,5,6,7 - hexahydro - 9-methoxy-7,12-dimethyl-$1\underline{H}$-2,7 - methano-3-benzazonine and 2,3,4,5,6,7-hexahydro-10-methoxy - 1,12 - dimethyl-$1\underline{H}$-1,6-methano-4-benzazo-nine.—The purified mixture obtained in Example VIII is dissolved in tetrahydrofuran and is then reduced at room temperature and atmospheric pressure with 1 mole equivalent of lithium aluminum hydride for 6 hours. The reaction mixture is cooled and is decomposed by pouring into a mixture of ice and water. The mixture is filtered and evaporated yielding a mixture of 2,3,4,5,6,7-hexahydro-9-methoxy - 7,12 - dimethyl-$1\underline{H}$-2,7-methano-3-benzazonine and 2,3,4,5,6,7-hexahydro-10-methoxy-1,12-dimethyl-$1\underline{H}$-1,6-methano-4-benzazonine.

Example X 2,3,4,5,6,7 - Hexahydro-7,12-dimethyl-$1\underline{H}$-2,7-methano-3 - benzazonin - 9 - ol and 2,3,4,5,6,7-hexahydro-1,12-dimethyl - $1\underline{H}$ - 1,6 - methano-4-benzazonin-10-ol.—The product obtained in Example IX is heated with pyridiniumhydrochloride at 150–180° C. for 10 hours. The reaction mixture is cooled to room temperature and made alkaline with 0.1 N sodium hydroxide. It is then extracted with chloroform and the organic layer is evaporated to dryness. The residue is recrystallized twice from benzene, yielding the 2,3,4,5,6,7-hexahydro-*trans*-7,12-dimethyl-$1\underline{H}$-2,7-methano-3-benzazonin-9-ol, M.P. 244°–246° C. The isomeric 2,3,4,5,6,7-hexahydro - 1,12 - dimethyl-$1\underline{H}$-1,6-methano-4-benzazonin-10-ol remains in the mother liquor with the 2,3,4,5,6,7 - hexahydro-*cis*-7,12-dimethyl-$1\underline{H}$-2,7-methano-3-benzazonin-9-ol.

Example XI

*dl*,2,3,4,5,6,7 - hexahydro-7,12-dimethyl-3-(3-methyl-2-butenyl) - 2,7-methano-$1\underline{H}$-3-benzazonin-9-ol.—One mole of 2,3,4,5,6,7-hexahydro-$\overline{7}$,12-dimethyl-$1\underline{H}$-2,7-methano-3-benzazonin-9-ol and 3-methyl-2-butenylchloride is refluxed for 5 hours in dimethylformamide in the presence of 1 mole equivalent of sodium bicarbonate. The reaction mixture is diluted with water and extracted with chloroform. The chloroform solution yielded dl,2,3,4,5,6,7-hexahydro-7,12 - dimethyl-3-(3-methyl-2-butenyl)-2,7-methano-1H-3-benzazonin-9-ol which was transformed to its hydrobromide salt, M.P. 216–218° C.

Example XII 2,3,4,5,6,7 - hexahydro - cis - 7,12-dimethyl-1H-2,7-methano-3-benzazonin-9-ol.—The residue obtained from the mother liquor in Example X is purified by crystallization and gas phase chromatography to yield the 2,3,4,5,6,7 - hexahydro - cis-7,12-dimethyl-1H-2,7-methano-3-benzazonin-9-ol which is separated from the mixture of cis and trans - 2,3,4,5,6,7 - hexahydro-1,12-dimethyl-1H-1,6-methano-4-benzazonin-10-ol.

Example XIII

The product of Example VII is separated by fractional crystallization, followed by gas phase chromatography to yield the isomeric compounds 1,2,3,5,6,7 - hexahdyro-9-methoxy - 7 - methyl - 12-methylene-4H-2,7-methano-3-benzazonin-4-one and 1,2,3,4,6,7-hexahydro-10-methoxy-1 - methyl-12-methylene-5H-1,6-methano-4-benzazonin-5-one.

Example XIV

The product of Example VIII is separated by fractional crystallization, followed by gas phase chromatography to yield the isomeric 1,2,3,5,6,7-hexahydro-9-methoxy-7,12-dimethyl - 4H-2,7-methano-3-benzazonin-4-one and 1,2,3-4,6,7 - hexahydro - 10 - methoxy-1,12-dimethyl-5H-1,6-methano-4-benzazonin-5-one.

Example XV

The product of Example IX is separated by crystallization, followed by gas phase chromatography to yield the isomeric compounds, 2,3,4,5,6,7 - hexahydro-9-methoxy-7,12 - dimethyl-1H-2,7-methano-3-benzazonine and 2,3,4-5,6,7 - hexahydro - 10 - methoxy-1,12-dimethyl-1H-1,6-methano-4-benzazonine.

Example XVI

By procedures analogous to those employed above, the following compounds are prepared:

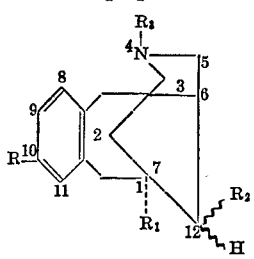

| R | R₁ | R₂ | R₃ |
|---|----|----|----|
| $CH_3-$ | $CH_3-$ | $C_2H_5-$ | $n\text{-}C_3H_7-$ |
| ⟨⟩-$CH_2-CH_2-$ | $C_2H_5-$ | $CH_3-$ | $-CH_2-CH=CH_2$ |
| $C_2H_5O-$ | $CH_3-$ | $CH_3-$ | ⟨⟩-$CH_2-CH_2-$ |
| $C_2H_5-$ | $CH_3-$ | $CH_3-$ | ⟨⟩- |
| $n\text{-}C_3H_7-$ | $CH_3-$ | $CH_3-$ | ⟨⟩-$CH_2-$ |
| $CH_3-$ | $CH_3-$ | $CH_3-$ | ⟨⟩-$CH_2-$ |

Example XVII

By procedures analogous to those employed above, the following compounds are prepared:

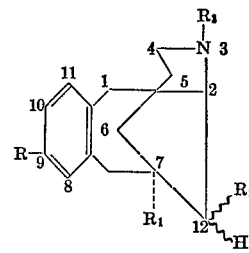

| R | R₁ | R₂ | R₃ |
|---|----|----|----|
| $CH_3-$ | $CH_3-$ | $C_2H_5-$ | $n\text{-}C_3H_7-$ |
| ⟨⟩-$CH_2-CH_2$ | $C_2H_5$ | $CH_3$ | $-CH_2-CH=CH_2-$ |
| $C_2H_5O-$ | $CH_3-$ | $CH_3-$ | ⟨⟩-$CH_2-CH_2-$ |
| $C_2H_5-$ | $CH_3-$ | $CH_3-$ | ⟨⟩- |
| $n\text{-}C_3H_7-$ | $CH_3-$ | $CH_3-$ | ⟨⟩-$CH_2-$ |
| $CH_3-$ | $CH_3-$ | $CH_3-$ | ⟨⟩-$CH_2-$ |

I claim:
1. The compound which is 2,3,4,5,6,7-hexahydro-trans-7,12-dimethyl-1H-2,7-methano-3-benzazonin-9-ol.
2. The compound which is 2,3,4,5,6,7-hexahydro-cis-7,12-dimethyl-1H-2,7-methano-3-benzazonin-9-ol.
3. The composition of matter which is dl,2,3,4,5,6,7-hexahydro - 7,12 - dimethyl-3-(3-methyl-2-butenyl)-2,7-methano-1H-3-benzazonin-9-ol.

References Cited
UNITED STATES PATENTS

| | | | |
|---|---|---|---|
| 3,345,373 | 10/1967 | Gordon et al. | 260—293.54 |
| 3,250,678 | 5/1966 | Archer | 260—293.54 |
| 3,372,165 | 3/1968 | Archer | 260—293.54 |
| 3,382,249 | 5/1968 | Albertson | 260—293.54 |
| 3,499,906 | 3/1970 | Robinson et al. | 260—293.54 |
| 3,514,463 | 5/1970 | Robinson et al. | 260—293.54 |
| 3,351,626 | 11/1967 | Bartels-Keith | 260—293.54 |
| 3,138,603 | 6/1964 | May | 260—293.54 |

OTHER REFERENCES

Takeda et al.: J. Med. Chem., vol. 13, pp. 630–634 (1970), RS 1J5.

DONALD G. DAUS, Primary Examiner

R. D. McCLOUD, Assistant Examiner

U.S. Cl. X.R.

260—239 BB, 239.3 T, 345.9, 566 A, 613 R, 621 R; 424—244